United States Patent [19]

Chandler

[11] Patent Number: 5,238,288
[45] Date of Patent: Aug. 24, 1993

[54] PICK-UP TRUCK BED COLLAPSIBLE COVER

[76] Inventor: M. Robert Chandler, 167 Lakeview, Grosse Pointe Farms, Mich. 48236

[21] Appl. No.: 899,243

[22] Filed: Jun. 15, 1992

[51] Int. Cl.⁵ .............................................. B62D 25/06
[52] U.S. Cl. ..................................... 296/100; 296/26; 296/164; 135/88
[58] Field of Search ................ 296/100, 26, 160, 165; 135/88, 111

[56] References Cited

U.S. PATENT DOCUMENTS

| | | | |
|---|---|---|---|
| 849,675 | 4/1907 | Gilleland et al. | 296/105 |
| 1,183,269 | 5/1916 | Beck | 296/109 |
| 1,195,316 | 8/1916 | Womack | 296/109 |
| 1,863,957 | 6/1932 | Woolcott | 296/105 |
| 2,068,041 | 1/1937 | Tate | 296/105 |
| 3,201,171 | 8/1965 | Wickard | 296/100 |
| 3,231,305 | 1/1966 | Beckman | 296/100 |
| 3,256,896 | 6/1966 | Cummins | 296/100 |
| 3,479,079 | 11/1969 | Coursault | 296/26 |
| 3,688,787 | 9/1972 | Feather | 296/100 X |
| 3,773,379 | 11/1973 | Loiseau | 296/107 |
| 3,901,548 | 8/1975 | Seaman | 296/100 |
| 4,272,119 | 6/1981 | Adams | 296/100 |
| 4,273,377 | 6/1981 | Alexander | 296/100 |
| 4,284,303 | 8/1981 | Hather | 296/100 |
| 4,289,346 | 9/1981 | Bourgeois | 296/105 |
| 4,310,194 | 1/1982 | Biller | 296/159 |
| 4,611,848 | 9/1986 | Romano | 296/100 |
| 4,657,062 | 4/1987 | Tuerk | 160/243 |
| 4,673,209 | 6/1987 | Rafi-Zadeh | 296/100 |
| 4,709,956 | 12/1987 | Bowman | 296/100 |
| 4,721,336 | 1/1988 | Jones | 296/100 |
| 4,730,866 | 3/1988 | Nett | 296/100 |
| 4,756,571 | 7/1988 | Lake | 296/100 |
| 4,789,196 | 12/1988 | Fields | 296/100 |
| 4,838,602 | 6/1989 | Nett | 296/100 |
| 4,964,669 | 10/1990 | Geier | 296/100 |

FOREIGN PATENT DOCUMENTS

| | | | |
|---|---|---|---|
| 225048 | 3/1961 | Austria | 296/100 |

*Primary Examiner*—Robert R. Song
*Attorney, Agent, or Firm*—Barnes, Kisselle, Raisch, Choate, Whittemore & Hulbert

[57] ABSTRACT

A cover structure for a pick-up truck in which a cover of flexible sheet material is supported by framework over the cargo body. The framework comprises front and rear bow frames pivoted to slides which are mounted in side rails and capable of being locked to the side rails in adjusted positions. The framework also includes supplemental frames pivoted to the bow frames. The side and rear panels of the cover are secured to the side and rear walls of the cargo body by Velcro strips. The front panel is secured to the front wall by a C-shaped channel clamp. The front and rear panels of the cover have detachable windows. The framework may be collapsed, with the cover still in place, to a stored position beneath the upper edges of the side and end walls of the cargo body, in which position a major portion of the cargo body is substantially unobstructed and available as cargo space. In preparation for collapsing, the side, rear and front panels are released and the front and rear panels preferably detached. The detached panels may then be wrapped around the collapsed frame.

29 Claims, 5 Drawing Sheets

PICK-UP TRUCK BED COLLAPSIBLE COVER

This invention relates generally to truck covers, and more particularly to a collapsible cover structure for pick-up trucks and the like.

BACKGROUND OF THE INVENTION

Various different types of pick-up truck covers, cover-supporting frames and tie downs have been employed in the past, respresentative examples of which are disclosed in U.S. Pat. Nos. 3,201,171, 4,272,119 and 4,611,848. U.S. Pat. No. 3,773,379 is an example of a cover assembly in which the side and rear panels of the cover are tied down by shock cords and the frame when folded or collapsed is disposed entirely above the plane of the upper edges of the side walls of the cargo body. U.S. Pat. No. 4,310,194 discloses a tent camper for a pick-up truck which includes a collapsible frame and a cloth top stretched over the frame. The framework pivots into a collapsed position which inherently occupies substantially the entire area of the truck bed cargo area. When collapsed the framework protrudes considerably above the plane of the upper edges of side walls of the truck. This is also the case when the cover-supporting frame in U.S. Pat. No. 1,195,316 is collapsed.

Additional prior art is shown in the following U.S. Patents:

| | | |
|---|---|---|
| 849,675 | 3,688,787 | 4,611,848 |
| 1,183,269 | 3,773,379 | 4,657,062 |
| 1,195,316 | 3,901,548 | 4,709,956 |
| 1,863,957 | 4,272,119 | 4,721,336 |
| 2,068,041 | 4,273,377 | 4,756,196 |
| 2,201,171 | 4,284,303 | 4,789,196 |
| 3,231,305 | 4,289,346 | 4,673,209 |
| 3,256,896 | 4,310,194 | 4,730,866 |
| | | 4,838,602 |

SUMMARY OF THE INVENTION

It is an object of this invention to provide a truck bed cover and supporting frame which is an improvement upon those which are known in the prior art. More specifically, the cover structure of the present invention provides inside channel rails for the front and rear bow frames of a supporting framework. The bow frames are pivoted to sliders mounted on the rails and can swing to a generally upright position or to a collapsed position, preferably toward the front, beneath the upper edges of the side and end walls of the cargo body in which most of the bed of the cargo body is available for cargo. In addition, fastener strips of the type commonly known as Velcro fastener strips are provided on the outer surfaces of the side walls of the cargo body as well as the tail gate which cooperate with similar strips on the cover to anchor the cover over the supporting framework, providing a weather-tight, wind-proof attachment of the cover to the truck bed. These same strips on the cargo body also may be used for attachment of a tonneau cover over the top edges of the cargo body after the cover has been collapsed.

In addition, the bow frames of the cover supporting framework are preferably attached to the inner surface of the fabric cover. Such attachments enable the flexible cover to assist in the support of the framework and the framework to assist in the support of the flexible cover.

The cover structure of the invention also has removable windows in both the front and rear panels of the cover structure.

It is a further object to provide a cover structure for the cargo body of a pick-up truck which is composed of a relatively few simple parts, which is rugged and durable, and easy to manufacture, assemble and disassemble.

These and other objects, features and advantages of the invention will become more apparent as the following description proceeds, especially when considered with the accompanying drawings, which are to scale unless otherwise noted:

DETAILED DESCRIPTION

Figures 1, 2A:
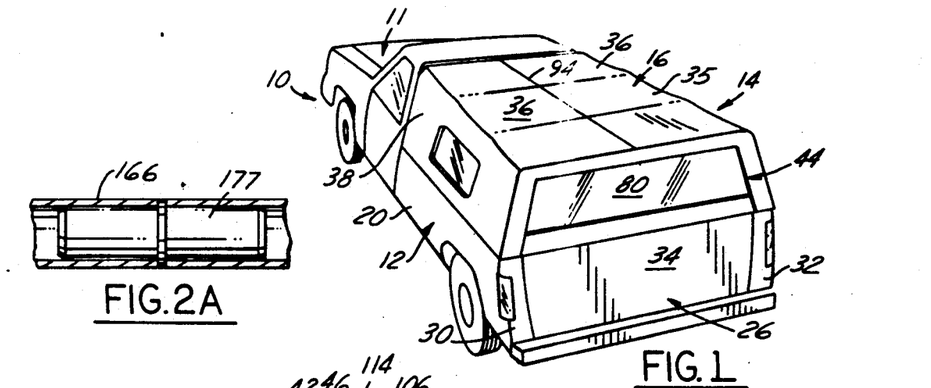
FIG. 1 is a perspective view of a pick-up truck having a cargo body provided with cover structure constructed in accordance with the invention.
FIG. 2A is an enlarged fragmentary view taken on the line 2A—2A in FIG. 2.

Referring now more particularly to the drawings, the pick-up truck 10 has a cab 11 and an open-top cargo body 12 behind the cab. A cover structure 14 is provided to enclose the cargo body 12 and comprises a cover member 16 and cover-supporting framework 18.

The cargo body 12 has generally vertical side walls 20 and 22, and front and rear end walls 24 and 26. The walls 20-26 26 extend upwardly from the generally horizontal bottom or bed 28 of the cargo body, with their upper edges preferably occupying a common generally horizontal plane. The rear end wall 26 in this instance has laterally spaced apart body portions 30 and 32 between which is a tail gate 34 hinged at the bottom for swinging movement from the closed, generally vertical position shown, to an open, rearwardly extending, generally horizontal position.

The cover member 16 preferably includes a sheet 35 of fabric or like flexible material and has a top panel 36, side panels 38 and 40 and front and rear panels 42 and 44.

Figure 11:
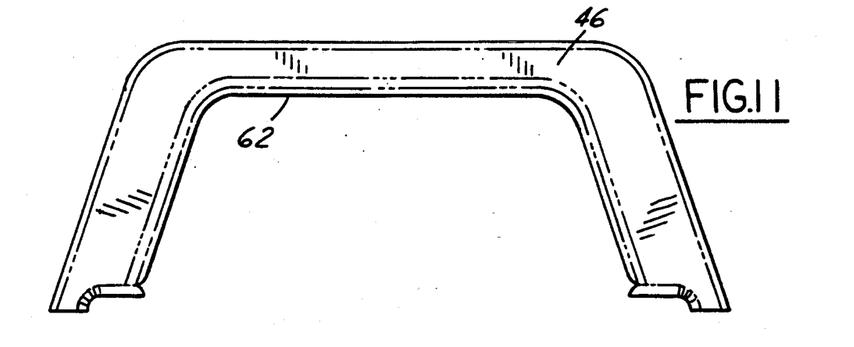
FIG. 11 is an elevational view of the fabric portion of the front panel of the cover.
Figure 12:
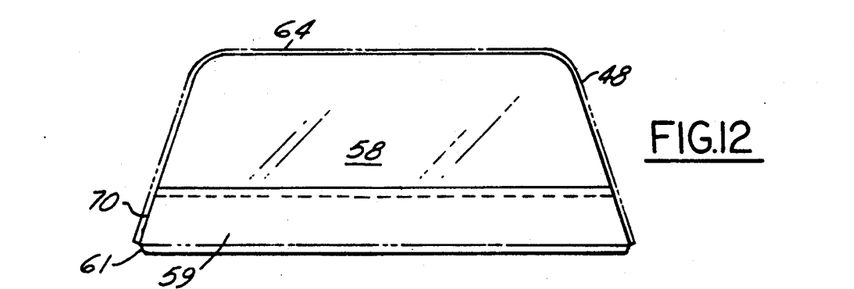
FIG. 12 is an elevational view of the window portion of the front panel of the cover.

The front panel 42 of the cover member 16 has a fabric portion 46 shown in detail in FIG. 11, and a window portion 48 shown in detail in FIG. 12. The fabric portion may be integral with the side and top panels of the cover member, or, as in this instance, it may be a separate member marginally stitched or otherwise permanently secured to the side and top panels.

FIG. 11 shows the fabric portion 46 of the front panel as being of inverted, generally U-shape. The window portion 48 is shaped to fit within the U of the fabric portion 46, and comprises an upper transparent pane 58 of glass or flexible plastic, for example, and a lower flap 59 of fabric material similar to the material of the cover sheet 35. Flap 59 is secured to the lower edge portion of the transparent pane 58 in any suitable manner. The bottom edge of the flap is folded back upon itself and stitched to the main body portion of the flap to provide an open-ended tubular passage or tunnel 61.

The window portion 48 of the front panel is removably secured to the fabric portion 46 thereof by one and preferably by two slide fasteners or zippers 60 and 63. Slide fasteners 60 and 63 each have co-acting gripper strips 62 and 64, the strips 62 extending along the U-shaped inner edge of the fabric portion from the outer extremities to the top center thereof, and the strips 64 extending from the ends 70 and 72 of the flap 59 along the U-shaped upper and side edges of the pane 58 to the top center thereof. When the window portion 48 is placed within the fabric portion 46, the slide tab operators 74 and 75 are manipulated to cause the slide fastener strips 60 and 62 to interengage and thus secure the portions 46 and 48 together. As shown, the slide tab operators 74 and 75 are preferably at the top center when the zippers are closed. The tab operators 74 and 75 are preferably of the dual tab type, having tabs on both sides of the front panel so that the zippers may be operated from inside the cover structure or from the outside by reaching from the cab of the truck.

Figure 13:
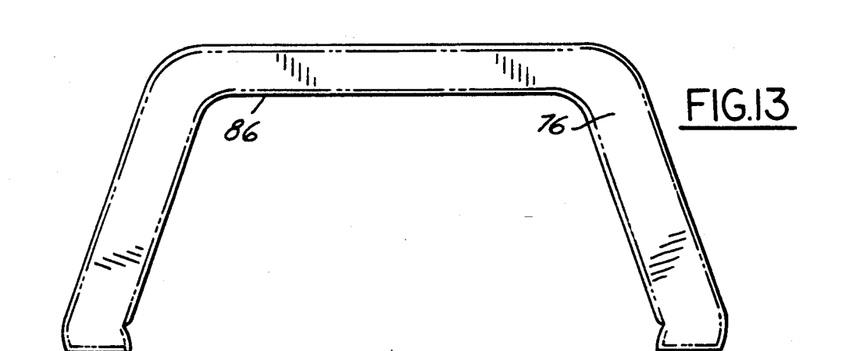
FIG. 13 is an elevational view of the fabric portion of the rear panel of the cover.
Figure 14:
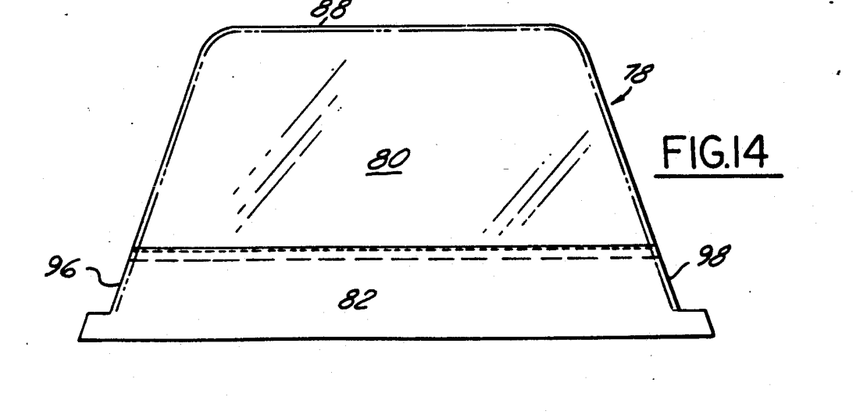
FIG. 14 is an elevational view of the window portion of the rear panel of the cover.

The rear panel 44 of the cover member 16 has a fabric portion 76 shown in detail in FIG. 13, and a window portion 78 shown in detail in FIG. 14. The fabric portion 76 may be integral with the side and top panels of the cover member, or, as in this instance, it may be a separate member marginally stitched or otherwise permanently secured to the side and top panels.

FIG. 13 shows the fabric portion 76 of the rear panel as being of inverted generally U-shape. The window portion 78 is shaped to fit within the U of the fabric portion 76, and comprises an upper transparent pane 80 of glass or flexible plastic, for example, and a lower flap 82 of fabric material similar to the material of the cover sheet 35. Flap 82 is secured to the lower edge portion of the transparent pane 80 in any suitable manner.

The window portion 78 of the rear panel is removably secured to the fabric portion 76 thereof by a slide fastener or zipper 84. Slide fastener 84 has co-acting gripper strips 86 and 88, the strip 86 extending along the U-shaped inner edge of the fabric portion and the strip 88 extending along the U-shaped upper and side edges of the pane 80 and also along the ends 96 and 98 of the flap 82. When the window portion 78 is inserted within the fabric portion 76, the slide tab 100 is operated to cause the slide fastener strips 86 and 88 to interengage and thus secure the portions 76 and 78 to one another.

Figure 10:
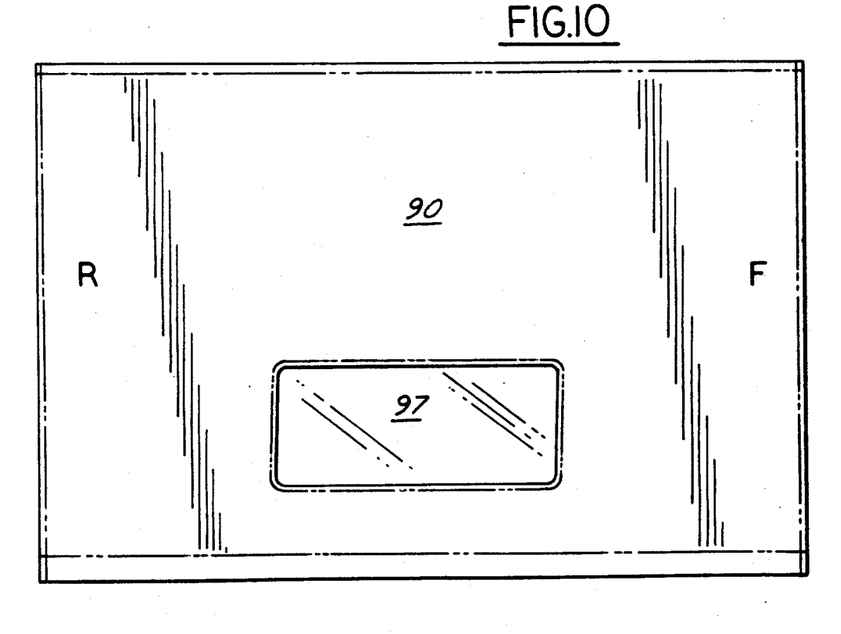
FIG. 10 is a plan view of a portion of the flexible cover sheet.
Figures 15, 16:
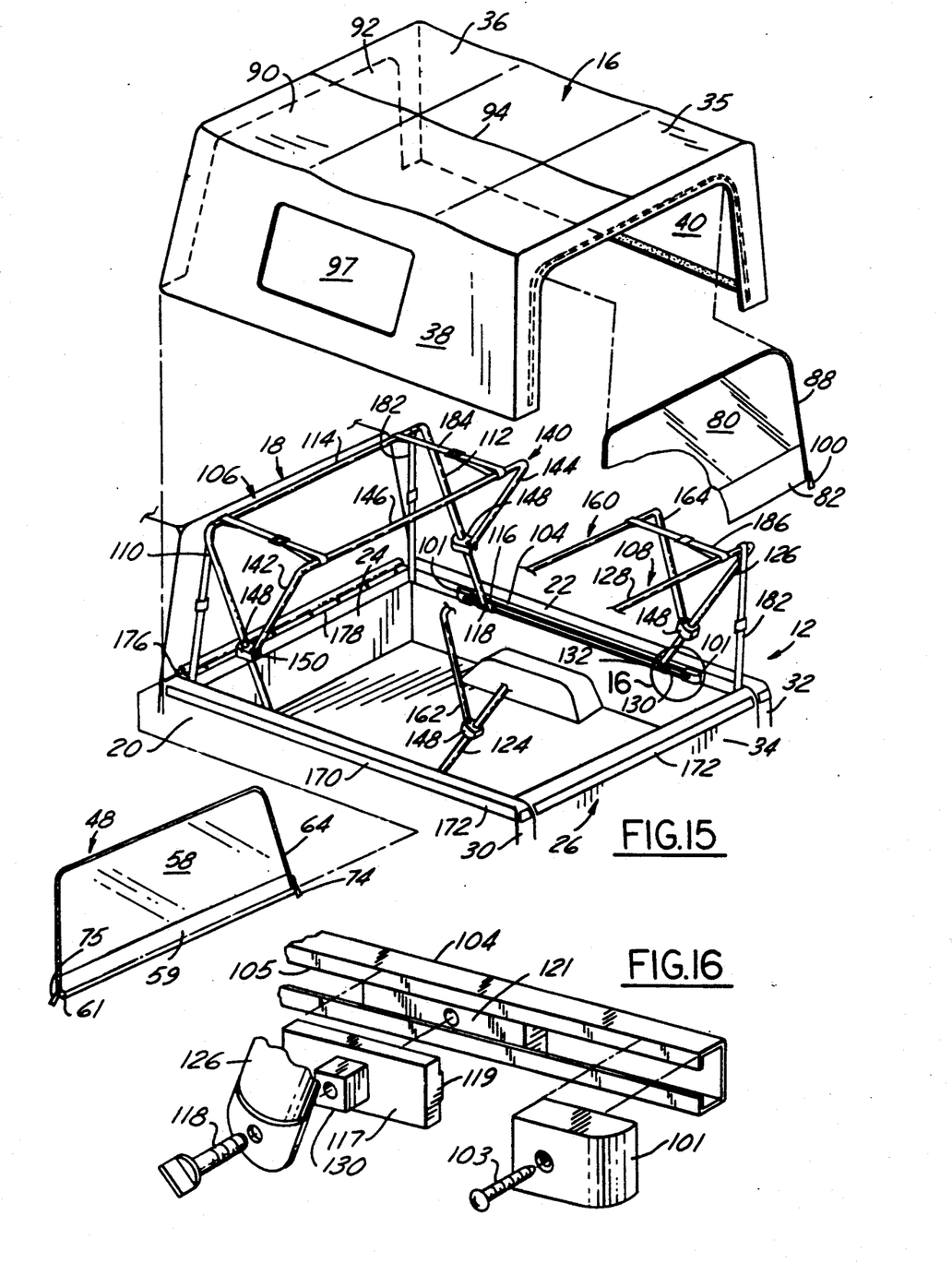
FIG. 15 is an exploded view with parts broken away showing the cover structure and cover-supporting framework.
FIG. 16 is a fragmentary perspective view of portions of the cover-supporting framework.

As shown in FIGS. 10 and 15, the top panel 36 and side panels 38 and 40 may be formed of two identical fabric pieces 90 and 92, stitched or otherwise secured together along the line 94. FIG. 10 shows one such fabric piece 90 which comprises one complete side panel and half of the top panel. Each side panel of the cover sheet 35 may have a window 97 of glass or flexible plastic, for example.

The cover-supporting framework 18 is mounted on the cargo body 12 by horizontal rails 102 and 104 secured to the inner surfaces of the respective side walls 22 and 24 near the upper edges thereof by mounting blocks 101 and fasteners 103. Each rail is preferably a tubular member of rectangular cross-section which has a slot 105 in the inner wall thereof extending throughout the length of the rail. The rails extend lengthwise of the truck in laterally spaced apart, generally parallel relation.

The framework 18 has front and rear bow frames 106 and 108. Front bow frame 106 is generally U-shaped, having laterally spaced side bars 110 and 112 and a cross bar 114 connecting the outer ends of the side bars. A slide 116 slidably engages rail 102 and is pivoted to the inner end of side bar 110 by a pivot pin 118, and a second slide 116 slidably engages rail 104 and is pivoted to the inner end of side bar 112 also by a pivot pin 118. The slides 116 remain in lateral alignment at all times and permit the front bow frame to slide forwardly and rearwardly along the rails 102 and 104.

The rear bow frame 108 is generally U-shaped, having laterally spaced side bars 124 and 126 and a cross bar 128 connecting the outer ends of the side bars. A slide 130 slidably engages rail 102 and is pivoted to the inner end of side bar 124 by a pivot pin 132, and a second slide 130 slidably engages rail 104 and is pivoted to the inner end of side bar 126 also by a pivot pin 132. The slides 130 are disposed rearwardly of the slides 116 and are in lateral alignment with each other at all times, permitting the rear bow frame to slide forwardly and rearwardly along the rails 102 and 104.

Each of the slides 116 and 130 comprises a block 117 having a raised rib 119 on one side which slidably engages in the rail slot 105. A body 121 preferably of a compressible elastomeric material such as rubber fits slidably within the rail. The pivot pin 118 or 132 is a threaded member or screw which extends through the body 121 and threads into a nut 123 which is preferably square and disposed in a similarly shaped socket in the body 121 so that the nut cannot rotate. The screw can be manually rotated and thereby loosened to permit adjustment of the slide along the rail, or tightened to lock the slide to the rail in adjusted position A supplemental frame 140 is associated with the front bow frame 106. The supplemental frame 140 is generally U-shaped, having laterally spaced side bars 142 and 144 and a cross bar 146 connecting the outer ends of the side bars. The inner ends of the side bars are pivoted to a mounting block 148 by a pivot pin 150. The blocks 148 are longitudinally slidably mounted on the side bars of the front bow frame 106 and are secured in adjusted position by a set screw 152.

A rear supplemental frame 160 is associated with the rear bow frame 108. The supplemental frame 160 is generally U-shaped, having laterally spaced side bars 162 and 164 and a cross bar 166 connecting the outer ends of the side bars. The inner ends of the side bars are pivoted to blocks 148 by pivot pins 150. The blocks are slidably mounted on the side bars of rear bow frame 108 and secured in adjusted positions by set screws 152.

Figure 2:
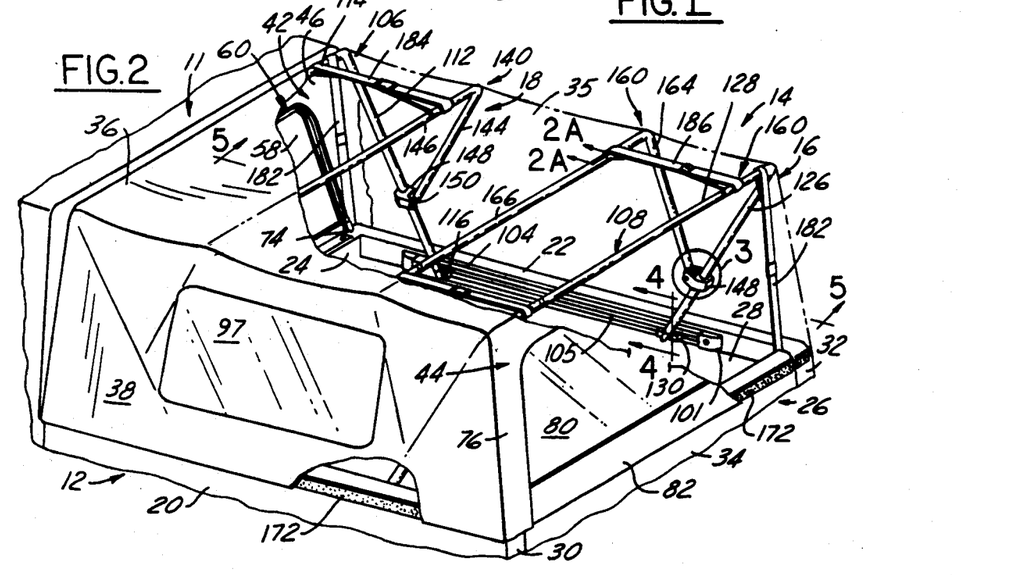
FIG. 2 is an enlarged perspective view in which the flexible cover sheet of the cover structure is partially broken away to show the cover-supporting framework.
Figure 3:
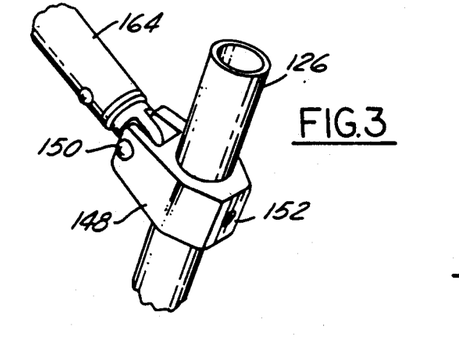
FIG. 3 is an enlarged perspective view of the structure shown within the circle 3 in FIG. 2.
Figure 4:
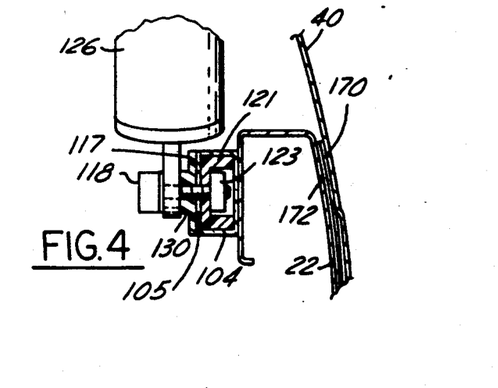
FIG. 4 is a fragmentary sectional view taken on the line 4—4 in FIG. 2.

The supplemental frame 160 in FIG. 2 is shown as being formed of separable tubular elements detachably connected by a friction plug 177. Both bow frames and both supplemental frames may, if desired, be formed of two or more separable elements similarly connected, or they may be of one-piece construction.

Figure 5:
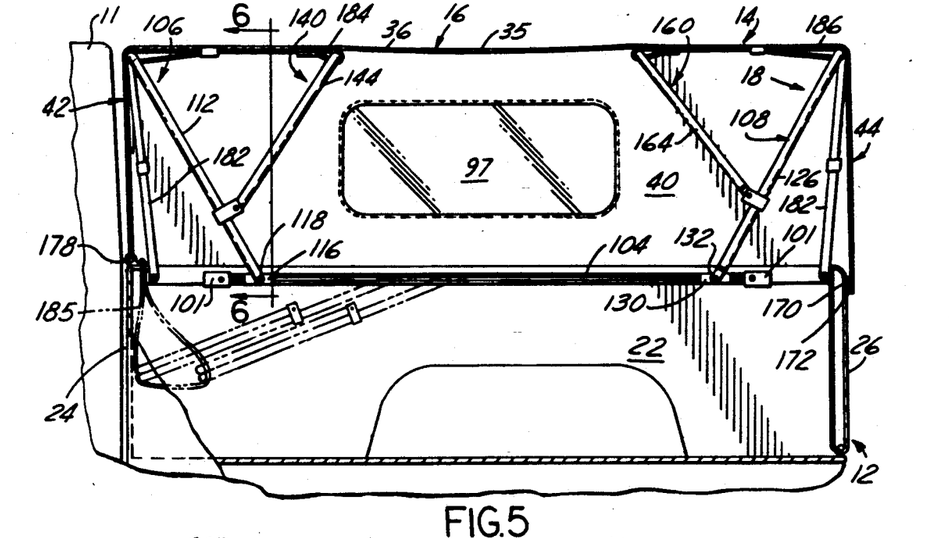
FIG. 5 is a sectional view taken on the line 5—5 in FIG. 2.

FIGS. 2, 5 and 15 show the framework 18 when in the erected or operative, cover-supporting position. The slides 116 are secured in laterally aligned positions adjacent the front ends of rails 102 and 104 with the front bow frames 106 extending upwardly and forwardly from the slides in a generally upright position. The slides 130 are secured in laterally aligned positions adjacent the rear ends of rails 102 and 104 with the rear bow frame 108 extending upwardly and rearwardly from the slides in a generally upright position.

The mounting blocks 148 for the lower ends of the side bars of the front supplemental frame 140 are secured to the side bars of the front bow frame 106 intermediate the ends thereof, and the supplemental bow frame 140 extends upwardly and rearwardly from blocks 148. The mounting blocks 148 for the lower ends of the side bars of the rear supplemental frame 160 are secured to the side bars of the rear bow frame 108 intermediate the ends thereof, and the supplemental frame 160 extends upwardly and forwardly from blocks 148.

Figure 6:
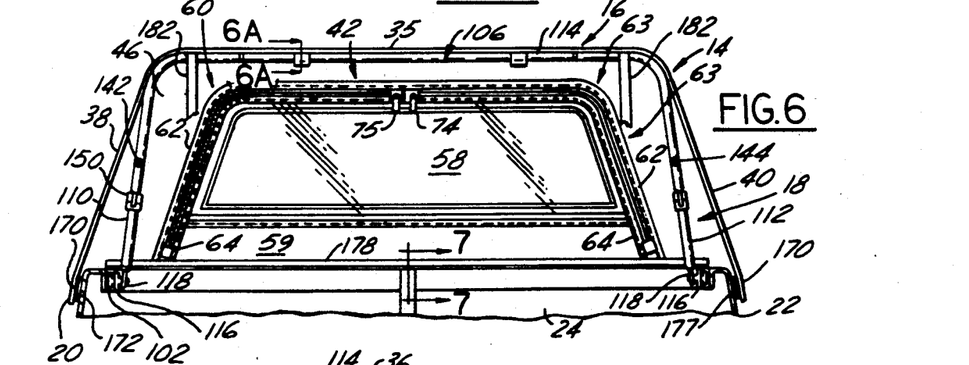
FIG. 6 is a sectional view taken on the line 6—6 in FIG. 5.
Figures 6A, 7:
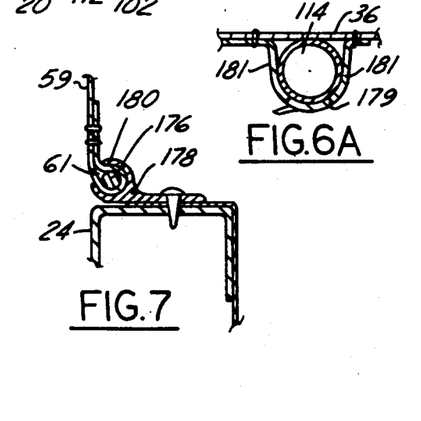
FIG. 6A is an enlarged view taken on the line 6A—6A in FIG. 5.
FIG. 7 is an enlarged fragmentary sectional view taken on the line 7—7 in FIG. 6.
Figure 8:
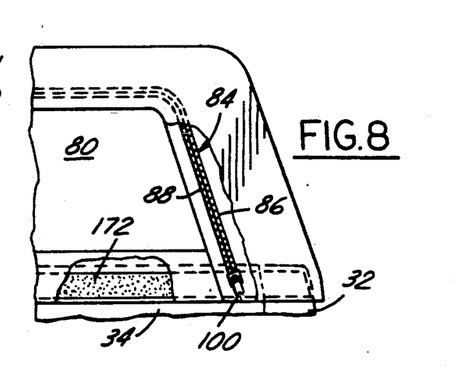
FIG. 8 is a fragmentary elevation showing a portion of the cover structure at the rear of the truck.

One or more belts or straps 182 of adjustable length are provided for each of the bow frames, pulling the front bow frame forwardly and the rear bow frame rearwardly to maintain them in generally upright position. The cross bar of the front bow frame engages the cover at the juncture of the top panel and front panel of the cover and the cross bar of the rear bow frame engages the cover at the juncture of the top and rear panels to place tension on the top panel. The cross bars of the front and rear bow frames may be releasably secured to the cover by pairs of strips 181 secured at one end to the cover and buckled together by buckle 179 at the other end (Figure 6A). The straps 182 are preferably secured to the cross bars of the bow frames and to the front and rear end walls of the cargo body preferably near the sides thereof. One or more belts or straps 184 of adjustable length are extended over the cross bars of the front bow frame 106 and front supplemental frame 140, and one or more belts or straps 186 of adjustable length are extended over the cross bars of the rear bow frame 108 and rear supplemental frame 160. These straps 184 and 186 are tightened to pull the front supplemental frame 140 forwardly and the rear supplemental frame 160 rearwardly, maintaining the desired spacing between the bow frames and supplemental frames and applying tension on the cover member 16.

The cover member 16 is draped over the upright framework as shown in the drawings. The lower edge portions of the side and rear end panels of the cover member 16 overlap the upper edge portions of the side and rear end walls of the cargo body 12, and are removably secured thereto preferably by fastener strips 170 and 172 of the hook and loop type, commonly known as Velcro fastener strips. Strips 170 are secured to the inner surfaces of the lower edge portions of the side panels 38 and 40 of the cover member 16, and to the inner surface of the lower edge portion of the flap 82 of rear panel 44. These strips 170 preferably extend continuously throughout the full length of the side and rear cover panels. Strips 172 are secured to the outer surfaces of the side and rear end walls 20, 22 and 26 of the cargo body 12 near the upper edge portions thereof. Such strips 172 preferably extend continuously throughout the full length of the side walls 20 and 22 and are applied in three sections to body portions 30 and 32 and tail gate 34 making up the rear wall 26 of the cargo body.

The strips 170 and 172 each have a plurality of hooks and loops. When applying the cover member 16, the side and rear panels are pulled down tightly so that the fastener strips 170 of the cover member register with and can be pressed against and secured to the fastener strips 172 of the cargo body.

The front panel 42 of the cover member 16 is anchored to the cargo body preferably by an elongated rod 176 and an elongated clamp bar 178. The rod extends within the tunnel 61 along the bottom edge of the flap 59 of the window portion 48. The clamp bar 178 is mounted on the upper edge of the front wall 24 of the cargo body and preferably extends throughout a major portion of the length thereof. The clamp bar has an open-ended C-shaped channel 180 extending lengthwise thereof and of a size to receive and retain the folded lower edge of the flap 59 with the rod 176 inserted within tunnel 61 thereof. The rod and flap material forming the tunnel for the rod form a bead which can be assembled with the clamp bar by being inserted endwise into one end of the channel 180.

Figure 9:
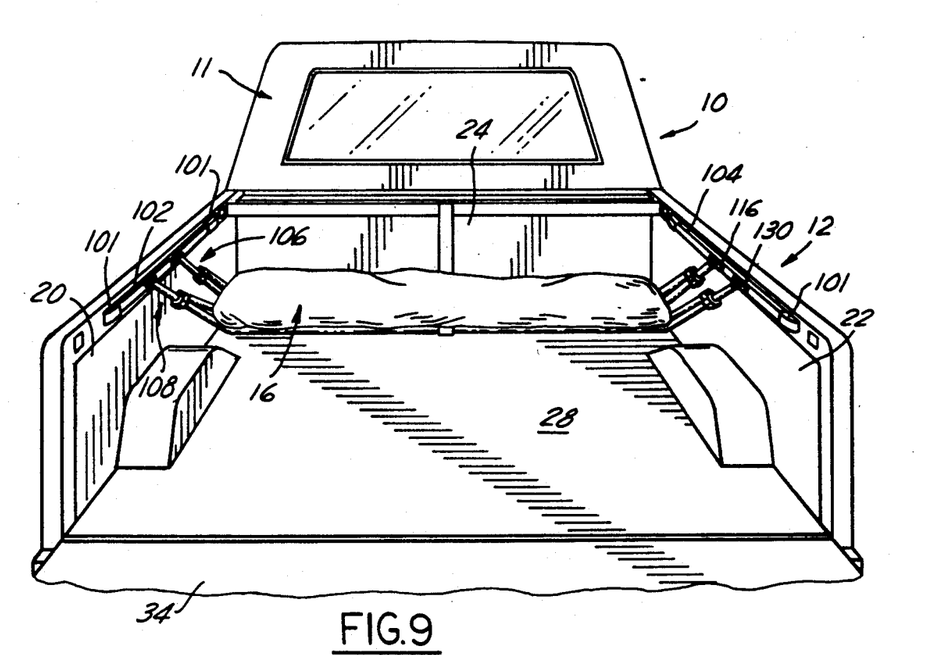
FIG. 9 is a perspective view of the rear of the truck showing the cover structure in collapsed and stored position.

When it is desired to collapse and store the cover structure, the strips 170 and 172 securing the side and rear end panels of the cover are released, and the rod 176 and lower edge of the flap 59 of the front cover panel are removed from clamp channel 180. The slides 116 and 130 may be loosened and the blocks 148 may also be loosened. Straps 182, 184 and 186 may be released. The slides are moved toward one another along the rails 102 and 104 and preferably secured, and the bow frames and supplemental frames swung to the stored position shown in FIGS. 5 and 9 with the supplemental frames flat against the bow frames so that their cross bars are close to each other and can be supported as by a strap 185 extending from the top of the front wall and looped under the cross bars of the frames or around the cover 16 if it remains on the collapsed frame. The cover 16 does not need to be removed when the cover structure is stored. It simply collapses and folds at the front of the cargo body, leaving most of the cargo bed available for cargo. The front and rear panels of the cover may be detached or not for storage, as desired. They are preferably flexible enough that they do not need to be removed for storage, but if removed may simply be wrapped around the collapsed and folded cover structure. It will be noted that the entire cover structure when stored as in FIGS. 5 and 9 is below the upper edges of the side and end walls of the cargo body. Hence a tonneau cover may be placed over the cargo body when the cover structure is collapsed, drawn across the upper edges of the side and end walls thereof and secured by the same Velcro strips 172 used to tie down the side and end panels of the cover.

The cover structure of this invention is lightweight and strong, and easily patterned to fit different sizes of truck beds and bed covers with several parts which are interchangeable and with identical bow frames and identical supplemental frames for any given model truck. The entire framework can be knocked down and stored with the flexible cover in a relative small tote bag. The transparent glass or plastic windows may be replaced by screens for camping, if desired.

A "soft top" cover is provided which is superior to other soft top covers yet is relatively inexpensive, and provides an attractive appearance comparable to more expensive, styled hard tops.

It is also to be understood that, although the foregoing description and drawings describe and illustrate in detail a successful working embodiment of the present invention, to those skilled in the art to which the present invention relates the present disclosure will suggest many modifications and constructions as well as widely different embodiments and applications without thereby departing from the spirit and scope of the invention. The present invention, therefore, is intended to be limited only by the scope of the appended claims and the applicable prior art.

What is claimed is:

1. A cover structure for a pick-up truck which has a cab and a carbo body behind the cab provided with side walls, a rear wall and a front wall having their upper edges generally occupying a common plane and surrounding a cargo bed so as to define therewith a cargo receiving space open at the top, said structure comprising:

first and second rails extending longitudinally of the body and secured to said respective side walls in parallel, laterally spaced apart relation, cover-supporting framework comprising a front bow frame and a rear bow frame, said front bow frame being of generally U-shape and having laterally spaced first and second front side bars, a front cross bar connecting the outer ends of said first and second front side bars, a first front slide pivotally connected to said first front side bar adjacent the inner end thereof and slidably engaging said first rail, a second front slide pivotally connected to said second front side bar adjacent the inner end thereof and slidably engaging said second rail, means for releasably clamping said first and second slides in adjusted positions along the lengths of said side rails, said rear bow frame being of generally U-shape and having laterally spaced first and second rear side bars, a rear cross bar connecting the outer ends of said first and second rear side bars, a first rear slide pivotally connected to said first rear side bar adjacent the inner end thereof and slidably engaging said first rail rearwardly of said first front slide, a second rear slide pivotally connected to said second rear side bar adjacent the inner end thereof and slidably engaging said second rail rearwardly of said second front slide, means for releasably clamping said first and second rear slides in adjusted positions along the lengths of said side rails, said front and rear bow frames being pivotable about their respective pivot connections on their respective slides so as to be swingable to a generally upright position of use projecting above the common plane of the upper edges of said side, rear, and front walls of said truck cargo body with said front and rear slides clamped in a first use position relative to one another wherein said front slides are widely spaced along said side rails from said rear slides and wherein said front and rear bow frames are respectively positioned generally above said cargo body front and rear walls, said front and rear slides being releasable for sliding movement along said rails relative to said truck cab to thereby bring said slides to a second frame storage position wherein said slides are more closely spaced relative to one another and further readjustably spaced relative to said cargo body front and rear walls to enable said bow frames to be pivotable about their respective pivot connections on their respective slides so as to be swingable from their generally upright position of use downwardly to a stored position in which said frames are collapsed together with said cross bars of said bow frames adjacent either said cargo body front wall or said cargo body rear wall, and a cover member of flexible sheet material fitted over said cover-supporting framework when said framework is operably arranged in the upright use position.

2. Cover structure as defined in claim 1, wherein said rails are mounted on the inside surfaces of said side walls below the upper edges thereof.

3. Cover structure as defined in claim 2, wherein said bow frames, when in stored position, are disposed within said cargo body below the upper edges of said side, rear and front walls thereof.

4. Cover structure as defined in claim 1, wherein said bow frames when in stored position have the cross bars thereof located adjacent one of the front and rear walls of said cargo body such that the major portion of said cargo body is substantially unobstructed by said bow frames and available as cargo space.

5. Cover structure as defined in claim 1, wherein said front bow frame in said generally upright position is inclined upwardly and forwardly and said rear bow frame in said generally upright position is inclined upwardly and rearwardly, said cover member having a generally horizontal top panel and generally vertical front and rear panels, said generally upright front and rear bow frames engaging said cover member at the juncture of said top panel with said front and rear panels respectively.

6. Cover structure as defined in claim 5, further comprising means for holding said bow frames generally upright including tension members between said bow frames and the truck body.

7. Cover structure as defined in claim 1, wherein said cover-supporting framework includes a first supplemental frame of generally U-shape having laterally spaced side bars and a cross bar connecting the outer ends thereof, means for pivotally connecting the inner ends of the side bars of said first supplemental frame to said respective side bars of said front bow frame in adjusted positions at intermediate points along the length of the latter, a second supplemental frame of generally U-shape having laterally spaced side bars and a cross bar connecting the outer ends thereof, and means for pivotally connecting the inner ends of the side bars of said second supplemental frame to said respective side bars of said rear bow frame in adjusted positions at intermediate points along the length of the latter, said supplemental frames being swingable to and from a generally upright position.

8. Cover structure as defined in claim 7, further comprising first releasable connecting means between said first supplemental frame and said front bow frame, and second releasable connecting means between said second supplemental frame and said rear bow frame, said first and second releasable connecting means holding said respective first and second supplemental frames in their generally upright positions.

9. Cover structure as defined in claim 8, wherein said first and second releasable connecting means each includes at least one adjustable tension strap.

10. Cover structure as defined in claim 7, wherein said rails are mounted on the inside surfaces of said side walls below the upper edges thereof, said bow frames, when in stored position, are disposed within said cargo body below the upper edges of said side, rear and front walls thereof, and said first and second supplemental frames, when said front and rear bow frames are in stored position, can be swung substantially flat upon said respective front and rear bow frames to positions also within said cargo body below the upper edges of said side, rear and front walls thereof.

11. Cover structure as defined in claim 10, wherein said bow frames when in stored position have the cross bars thereof located adjacent one of the front and rear walls of said cargo body and said supplemental frames are pivoted flat upon said respective stored bow frames, a major portion of said cargo body is substantially unobstructed and available as cargo space.

12. Cover structure as defined in claim 11, wherein said cover member remains fitted over said framework in said stored position.

13. Cover structure as defined in claim 12, including means for releasably securing the top panel of said cover member to at least two of said frames.

14. Cover structure as defined in claim 1, wherein said cover member has a top panel and front, side and rear panels, one of said front and rear panels having a detachable portion including a transparent window pane, and means including a slide fastener for releasably securing said detachable section to said one panel.

15. Cover structure as defined in claim 1, wherein said cover member has a top panel and front, side and rear panels, each of said front and rear panels having a detachable portion including a transparent pane, and means including slide fasteners for releasably securing said detachable portions to said respective front and rear panels.

16. Cover structure as defined in claim 1, wherein said cover member has a generally horizontal top panel and generally vertical rear and side panels, means for holding the lower edge portions of said rear and side panels to said rear wall and side walls of the truck body, respectively, comprising fastener cover strips extending along said lower edge portions of said rear and side panels of said cover member and complimentary fastener body strips extending along the outer surfaces of said rear and side walls of the truck body, said cover strips and body strips releasably interengaging to secure said lower edge portions of said rear and side panels of said cover member to said rear and side walls of the truck body, said cover and body fastener strips being of the hook and loop type with hook members on one of the interengaging strips and loop members on the other.

17. Cover structure as defined in claim 1, wherein said cover member has a top panel and front, side and rear panels, and means for releasably securing said front panel of said cover member to the front wall of said cargo body including a clamp having an open-ended C-shaped channel, means for mounting said clamp on the front wall of said cargo body, and means providing a bead along the lower edge portion of said front panel, said bead being insertable endwise into said C-shaped channel and retained therein against lateral withdrawal.

18. Cover structure as defined in claim 17, wherein said front panel has means providing a rod-receiving tunnel along its lower edge, and an elongated rod in said tunnel providing the aforesaid bead.

19. A cover structure for a pick-up truck which has a cab and a cargo body behind the cab provided with side walls, a rear wall and a front wall, said structure comprising: first and second rails extending longitudinally of the body and secured to said respective side walls in parallel, laterally space apart relation, cover-supporting framework comprising a front bow frame and a rear bow frame, said front bow frame being of generally U-shape and having laterally spaced first and second front side bars, a front cross bar connecting the outer ends of said first and second front side bars, a first front slide pivotally connected to said first front side bar adjacent the inner end thereof and slidably engaging said first rail, a second front slide pivotally connected to said second front side bar adjacent the inner end thereof and slidably engaging said second rail, means for releasably clamping said first and second slides in adjusted positions along the lengths of said side rails, said rear bow frame being of generally U-shape and having laterally spaced first and second rear side bars, a rear cross bar connecting the outer ends of said first and second rear side bars, a first rear slide pivotally connected to said first rear side bar adjacent the inner end thereof and slidably engaging said first rail rearwardly of said first front slide, a second rear slide pivotally connected to said second rear side bar adjacent the inner end thereof and slidably engaging said second rail rearwardly of said second front slide, means for releasably clamping said first and second rear slides in adjusted positions along the lengths of said side rails, said front and rear bow frames being swingable from a generally upright position projecting above the side, rear, and front walls of said truck body to a stored position, and a cover member of flexible sheet material fitted over said cover-supporting framework, said rails being mounted on the inside surfaces of said side walls below the upper edges thereof, and said bow frames, when in stored position, are disposed within said cargo body below the upper edges of said side, rear and front walls thereof.

20. A rear structure for a pick-up truck which has a cab and a cargo body behind the cab provided with side walls, a rear wall and a front wall, said structure comprising:

first and second rails extending longitudinally of the body and secured to said respective side walls in parallel, laterally spaced apart relation, cover-supporting framework comprising a front bow frame and rear bow frame, said front bow frame being of generally U-shape and having laterally spaced first and second front side bars, a front cross bar connecting the outer ends of said first and second front side bars, a first front slide pivotally connected to said first front side bar adjacent the inner end thereof and slidably engaging said first rail, a second front slide pivotally connected to said second front side bar adjacent the inner end thereof and slidably engaging said second rail, means for releasably clamping said first and second slides in adjusted positions along the lengths of said side rails, said rear bow frame being of generally U-shape and having laterally spaced first and second rear side bars, a rear cross bar connecting the outer ends of said first and second rear side bars, a first rear slide pivotally connected to said first rear side bar adjacent the inner end thereof and slidably engaging said first rail rearwardly of said first front slide, a second rear slide pivotally connected to said second rear side bar adjacent the inner end thereof and slidably engaging said second rail rearwardly of said second front slide, means for releasably clamping said first and second rear slides in adjusted positions along the lengths of said side rails, said front and rear bow frames being swingable from a generally upright position projecting above the side, rear, and front walls of said truck body to a stored position, and a cover member of flexible sheet material fitted over said cover-supporting framework, said front bow frame when in said generally upright position being inclined upwardly and forwardly and said rear bow frame when in said generally upright position being inclined upwardly and rearwardly, said cover member having a generally horizontal top panel and generally vertical front and rear panels, said generally upright front and rear bow frames engaging said cover member at the juncture of said top panel with said front and rear panels respectively, and means for holding said bow frames generally upright including tension members between said bow frames and the truck body.

21. A cover structure for a pick-up truck which has a cab and a cargo body behind the cab provided with side walls, a rear wall and a front wall, said structure comprising:

first and second rails extending longitudinally of the body and secured to said respective side walls in parallel, laterally spaced apart relation, cover-supporting framework comprising a front bow frame and a rear bow frame, said front bow frame being of generally U-shape and having laterally spaced first and second front side bars, a front cross bar connecting the outer ends of said first and second front side bars, a first front slide pivotally connected to said first front side bar adjacent the inner end thereof and slidably engaging said first rail, a second front slide pivotally connected to said second front side bar adjacent the inner end thereof and slidably engaging said second rail, means for releasably clamping said first and second slides in adjusted positions along the lengths of said side rails, said rear bow frame being of generally U-shape and having laterally spaced first and second rear side bars, a rear cross bar connecting the outer ends of said first and second rear side bars, a first rear slide pivotally connected to said first rear side bar adjacent the inner end thereof and slidably engaging said first rail rearwardly of said first front slide, a second rear slide pivotally connected to said second rear side bar adjacent the inner end thereof and slidably engaging said second rail rearwardly of said second front slide, means for releasably clamping said first and second rear slides in adjusted positions along the lengths of said side rails, said front and rear bow frames being swingable from a generally upright position projecting above the side, rear, and front walls of said truck body to a stored position, and a cover member of flexible sheet material fitted over said cover-supporting framework, said cover-supporting framework including a first supplemental frame of generally U-shape having laterally spaced side bars and a cross bar connecting the outer ends thereof, means for pivotally connecting the inner ends of the side bars of said first supplemental frame to said respective side bars of said front bow frame in adjusted positions at intermediate points along the length of the latter, a second supplemental frame of generally U-shape having laterally spaced side bars and a cross bar connecting the outer ends thereof, and means for pivotally connecting the inner ends of the side bars of said second supplemental frame to said respective side bars of said rear bow frame in adjusted positions at intermediate points along the length of the latter, said supplemental frames being swingable to and from a generally upright position.

22. Cover structure as defined in claim 21, further comprising first releasable connecting means between said first supplemental frame and said front bow frame, and second releasable connecting means between said second supplemental frame and said rear bow frame, said first and second releasable connecting means holding said respective first and second supplemental frames in their generally upright positions.

23. Cover structure as defined in claim 22, wherein said first and second releasable connecting means each includes at least one adjustable tension strap.

24. Cover structure as defined in claim 21, wherein said rails are mounted on the inside surfaces of said side walls below the upper edges thereof, said bow frames, when in stored position, are disposed within said cargo body below the upper edges of said side, rear and front walls thereof, and said first and second supplemental frames, when said front and rear bow frames are in stored position, can be swung substantially flat upon said respective front and rear bow frames to positions also within said cargo body below the upper edges of said side, rear and front walls thereof.

25. Cover structure as defined in claim 24, wherein said bow frames when in stored position have the cross bars thereof located adjacent one of the front and rear walls of said cargo body and said supplemental frames are pivoted flat upon said respective stored bow frames, a major portion of said cargo body is substantially unobstructed and available as cargo space.

26. Cover structure as defined in claim 25, wherein said cover member remains fitted over said framework in said stored position.

27. Cover structure as defined in claim 26, including means for releasably securing the top panel of said cover member to at least two of said frames.

28. A cover structure for a pick-up truck which has a cab and a cargo body behind the cab provided with side walls, a rear wall and a front wall, said structure comprising:

first and second rails extending longitudinally of the body and secured to said respective side walls in parallel, laterally spaced apart relation, cover-supporting framework comprising a front bow frame and a rear bow frame, said front bow frame being of generally U-shape and having laterally spaced first and second front side bars, a front cross bar connecting the outer ends of said first and second front side bars, a first front slide pivotally connected to said first front side bar adjacent the inner end thereof and slidably engaging said first rail, a second front side pivotally connected to said second front side bar adjacent the inner end thereof and slidably engaging said second rail, means for releasably clamping said first and second slides in adjusted positions along the lengths of said side rails, said rear bow frame being of generally U-shape and having laterally spaced first and second rear side bars, a rear cross bar connecting the outer ends of said first and second rear side bars, a first rear slide pivotally connected to said first rear side bar adjacent the inner end thereof and slidably engaging said first rail rearwardly of said first front slide, a second rear slide pivotally connected to said second rear side bar adjacent the inner end thereof and slidably engaging said second rail rearwardly of aid second front slide, means for releasably clamping said first and second rear slides in adjusted positions along the lengths of said side rails, said front and rear bow frames being swingable from a generally upright position projecting above the side, rear, and front walls of said truck body to a stored position, and a cover member of flexible sheet material fitted over said cover-supporting framework, said cover member having a top panel and front, side and rear panels, and means for releasably securing said front panel of said cover member to the front wall of said cargo body including a clamp having an open-ended C-shaped channel, means for mounting said clamp on the front wall of said cargo body, and means providing a bead along the lower edge portion of said front panel, said bead being insertable endwise into said C-shaped channel and retained therein against lateral withdrawal.

29. Cover structure as defined in claim 27, wherein said front panel has means providing a rod-receiving tunnel along its lower edge, and an elongated rod in said tunnel providing the aforesaid bead.

* * * * *